(12) United States Patent
Appel et al.

(10) Patent No.: US 7,200,520 B2
(45) Date of Patent: Apr. 3, 2007

(54) DEVICE AND METHOD FOR MONITORING AN ELECTRIC POWER STATION

(75) Inventors: Mirko Appel, München (DE); Wolfgang Fick, München (DE); Uwe Gerk, Frensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 56 days.

(21) Appl. No.: 10/528,732

(22) PCT Filed: Jul. 4, 2003

(86) PCT No.: PCT/EP03/07202

§ 371 (c)(1), (2), (4) Date: Mar. 22, 2005

(87) PCT Pub. No.: WO2004/034166

PCT Pub. Date: Apr. 22, 2004

(65) Prior Publication Data

US 2006/0025961 A1    Feb. 2, 2006

(30) Foreign Application Priority Data

Sep. 26, 2002    (EP)    .................................. 02021501

(51) Int. Cl.
*G06F 15/00* (2006.01)

(52) U.S. Cl. .......................... 702/182; 702/61; 702/62; 702/182; 700/286; 706/10; 706/14; 706/15; 706/FOR. 100; 318/561; 714/26

(58) Field of Classification Search ................ 702/61, 702/62, 182; 700/286; 706/10, 14, 15, FOR. 100; 318/561; 714/26

See application file for complete search history.

(56) References Cited

U.S. PATENT DOCUMENTS

| | | | | |
|---|---|---|---|---|
| 3,852,641 | A * | 12/1974 | Titus | ........................... 361/47 |
| 5,109,380 | A * | 4/1992 | Ogino | ......................... 714/26 |
| 5,642,000 | A * | 6/1997 | Jean-Jumeau et al. | ........ 307/31 |
| 6,181,759 | B1 * | 1/2001 | Heibel | ....................... 376/214 |
| 6,278,962 | B1 | 8/2001 | Klimasauskas et al. | |
| 6,353,815 | B1 | 3/2002 | Vilim et al. | |
| 6,438,430 | B1 | 8/2002 | Martin et al. | |
| 2002/0072828 | A1 | 6/2002 | Tumer et al. | |
| 2002/0133320 | A1 | 9/2002 | Wegerich et al. | |
| 2004/0044442 | A1 * | 3/2004 | Bayoumi et al. | ........... 700/286 |

OTHER PUBLICATIONS

Tomsovic et al., 'Methods of Approximate Resoning for Power System Equipment Condition and Reliability Analysis', 1996, IEEE Publication, pp. 310-315.*
Nian et al., 'The New Intelligent Monitoring Method for Operating States of Large Generator Units', 2000, IEEE Article, pp. 223-227.*
McCalley et al., 'A New Methodology for Determining Transmission Capacity Margin in Electric Power Systems', Aug. 1991, IEEE Publication, vol. 6, No. 3, pp. 944-951.*

* cited by examiner

*Primary Examiner*—Marc S. Hoff
*Assistant Examiner*—Elias Desta

(57) ABSTRACT

The invention concerns a method and a corresponding device for monitoring a technical installation. The invention is characterized in that a dynamic model of at least one system of the technical installation is enhanced by means of an artificial intelligence based algorithm during the operation of said system.

14 Claims, 2 Drawing Sheets

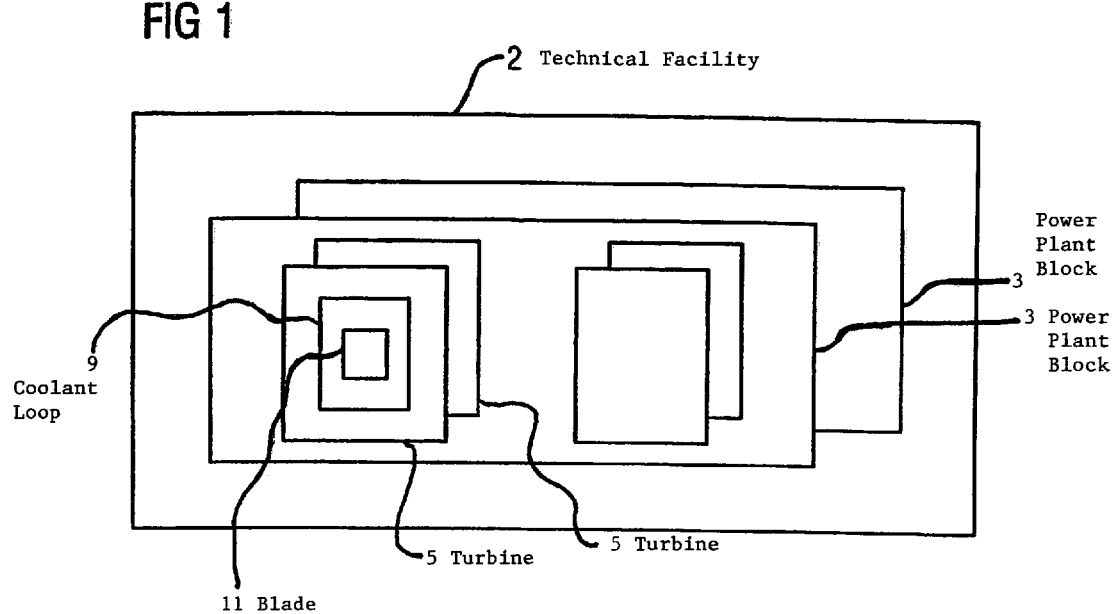
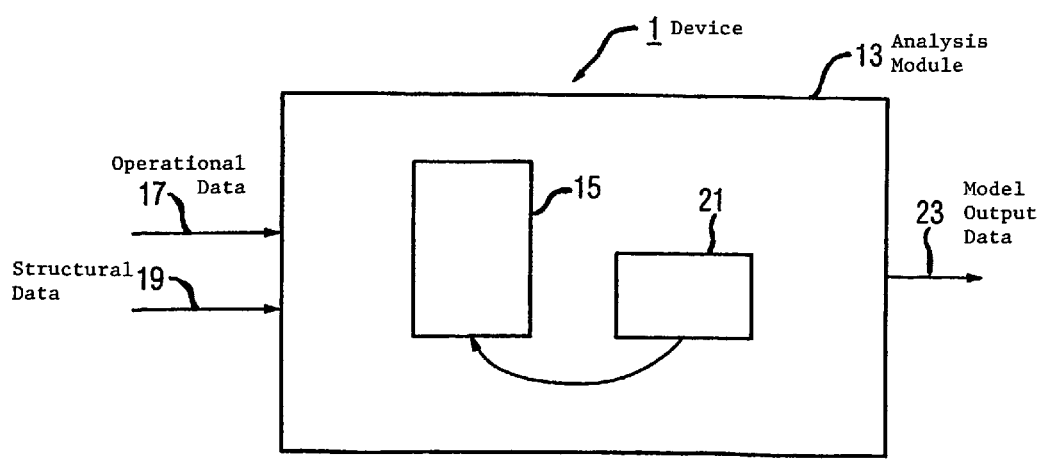

DEVICE AND METHOD FOR MONITORING AN ELECTRIC POWER STATION

CROSS REFERENCE TO RELATED APPLICATION

This application is the US National Stage of International Application No. PCT/EP2003/007202, filed Jul. 4, 2003 and claims the benefit thereof. The International Application claims the benefits of European Patent application No. 02021501.8 EP filed Sep. 26, 2002, both of the applications are incorporated by reference herein in their entirety.

FIELD OF THE INVENTION

The invention relates to a device as well as a method for monitoring a technical facility comprising multiple systems, in particular a power plant facility.

BACKGROUND OF THE INVENTION

Conventional devices and methods for monitoring a technical facility comprising multiple systems, in particular diagnostic methods and diagnostic equipment, are often based on the observation and/or measurement of specific operational parameters of the technical facility, whereby exceeding or falling short of a reference value calls for a maintenance procedure.

Naturally, the derivation of a necessary operational procedure by observing parameters measured in isolation is, at the same time, imprecise and prone to errors.

If, on the other hand, an abundance of data that accumulates in the technical facility, in particular measurement values from various measurement positions and/or corresponding stored historical measurement values, is consulted in order to create a picture of the present or future expected operational status, then this likewise leads to no satisfactory conclusion, because the mutual dependencies of this data from data sources which are generally highly diverse are mostly unknown, and therefore, likewise, no precise evaluation or even prediction of the operational situation from it is possible.

In addition, it is to be expected that not all data that exerts an influence on the operational situation of the facility is included, which makes the problem even more complicated.

SUMMARY OF THE INVENTION

As a result, the object of the invention is to show an improved device as well as a method for monitoring a technical facility comprising multiple systems, in particular a power plant facility. At the same time, high prediction accuracy in particular should be achievable with regard to a developing failure in the technical facility.

In addition, so-called "creeping process deviations" that lead away from a desired operational situation and practically always precede the appearance of a failure and/or a process disruption should be able to be identified as early in time as possible.

Furthermore, the expected point in time of the appearance of a failure should be identifiable as early in time as possible by means of a device according to the invention or a corresponding method, such that countermeasures (for example, a maintenance procedure) can be initiated before a failure of the facility or its components occurs.

In addition, a device according to the invention as well as a corresponding method should reduce the expense of diagnostic applications in the facility that have been customary up until now, and furthermore allow a better optimization of the control devices used.

The object according to the invention with regard to the device is achieved by means of a device for monitoring a technical facility comprising multiple systems, in particular a power plant facility, including at least one analysis module, which includes a dynamic model of at least one system of the technical facility, whereby operational and/or structural data for the technical facility can be supplied to the analysis module as input data, and at least one algorithm based on artificial intelligence incorporated by the analysis module, by means of which the dynamic model of the system can be improved during the operation of the system, whereby output data is identifiable by means of the analysis module, which characterizes the present and/or future operational behavior of the system.

At the same time, the invention starts from the consideration that, with conventional modeling known from the prior art, the achievable precision and thus the achievable degree of agreement with the corresponding actual measurements for the identified model measurements is too limited to come to reliable conclusions about a future behavior of the facility. At the present time, known modelings offer the most suitable results, i.e. there exists a high degree of agreement with the corresponding actual measurements at the present time. Therefore, the further in the future that the relevant point in time for the behavior of the facility lies, the greater the unreliability of the prediction.

An additional starting point for the invention lies in the realization that, in many cases, it is impossible or possible only at extremely great expense to specify a fairly accurate model for the technical facility (for example, because of a strongly non-linear behavior of certain systems of the technical facility).

With the device according to the invention, a dynamic model of at least one system of the technical facility is assumed, which is improved during operation by means of methods of artificial intelligence. The capability of the analysis module to describe and to forecast the operational behavior of the system is thereby improved.

At the same time, it is not urgently necessary to start with a complex, uniform dynamic model of the system. For example, a set of a few insular, simple equations and characteristics, which can be supplemented by means of a neural network (preferably structured in a simple manner), fuzzy logic or a genetic algorithm, often suffices. The interaction between these "partial models" for a system description is then improved during operation by means of the algorithm based on artificial intelligence such that an interrelationship develops for the said elements.

A model, particularly a deterministic one in the classical sense, is not necessary. On the contrary, the mentioned interrelationship is parameterized (for example, a Bernoulli equation for this relationship in order to use it on a specific existing flow), and the algorithm based on artificial intelligence searches in historical or present operational data and/or structural data of the system and/or of the technical facility for correlations, for example changes in measurements that are created as a consequence of the change in other measurements. Newly-discovered correlations of this type are then integrated into the dynamic model by means of the algorithm based on artificial intelligence—in particular as an additional characteristic and/or equation or as an adjustment of parameters of the dynamic model, for example of the network weight factors of a neural network—and these are thereby improved.

In the context of the invention, the term "system" should cover the range from a simple component—for example, a pipeline—up to a highly complex complete system, including a number of subsystems—for example a turbine set, a boiler facility, a power plant block or the complete power plant.

The term "operational data" is to be understood to mean, in particular, all types of data that accrue during the operation of the technical facility such as, for example, temperature measurements, pressure measurement data, thermal images, sensor data, messages, alarms, warning, and so forth.

The "algorithm based on artificial intelligence" includes, in particular, methods of artificial intelligence such as neural networks, fuzzy logic and genetic algorithms.

The "dynamic model" can be described deterministically and numerically or also by means of methods based on artificial intelligence. Furthermore, it can include physical and mathematical equations. Combinations of the mentioned elements are also included, in particular physical and/or mathematical equations that are linked by means of methods based on artificial intelligence.

In a preferred embodiment, the improvement of the dynamic model includes the identification of that input data which has not yet been previously used by the dynamic model, and the dynamic model can be expanded with the help of this input data.

At the same time, the algorithm based on artificial intelligence is used for the improvement of the dynamic model for the identification and establishment of correlations not yet considered in the dynamic model.

The dynamic model preferably includes one or more elements from the group {characteristic, physical equation, neural network, fuzzy logic, genetic algorithm}.

The dynamic model particularly includes at least one neural network, which can be trained with historical operational data from the system.

The modeling of technical components and facilities by means of neural networks is a known and proven procedure. A particular advantage to be seen therein is that an analytical description of the components to be modeled need not be known. The structure of the neural network first initialized by means of initial parameters ("initial weighting factors") and determined in advance through the training phase (which, for example, includes a known backpropagation algorithm) is designed with respect to its weighting factors such that a good correlation with the actual component can be expected after the conclusion of the training phase. In this manner one obtains a model of the component without being required to undertake a precise analytical analysis. In the training phase, the neural network learns to respond to specific input values with specific output values; together with their corresponding output values, input values of this type are often designated as a training set. In operation, the neural network then interpolates for input values that are not included in the training set, such that output values are also calculated for input values of this type.

During operation of the technical facility, the problem often appears that not all operational data that exerts an influence on the behavior of the component(s) to be modeled (or the entire technical facility as well) are known or ascertainable.

Furthermore, the use of at least one algorithm based on artificial intelligence makes it possible, by means of the dynamic model, to incorporate into the calculations of the status of the system of the technical facility those parameters that do not act directly on this system of the technical facility, for example as input and/or output signals or media flows. For example, for a serially ordered chain of systems, the modeling of a system located in the middle of this chain is provided, which—alongside input signals where appropriate acting directly upon this system—derive input signals from the preceding system that are not measurable or available in other ways.

At the same time, the methods of artificial intelligence (which can be designed according to biological evolution, for example, as genetic search algorithms based on a suitable characteristic combination) also then allow a calculation of the status of a system of the technical facility if the input parameters for the determination of the current status are largely unknown or identifiable only with difficulty, for example—as mentioned before—by means of a complex measurement of the output values of the preceding system.

For example, statistical methods can also be used at the same time in connection with the algorithm based on artificial intelligence, whereby the most probable input and/or output values for a system that are not otherwise accessible are used in a current operational situation in which the algorithm based on artificial intelligence determines these input and/or output values of the respective system which are required by the dynamic model, for example, through an evolutionary search strategy.

In this manner, a good correlation for the model of at least one system can be expected with the actual behavior of this system, because also included in the modeling of the system by means of at least one algorithm based on artificial intelligence is that operating data that would otherwise be ignored and would lead to a more or less high level of imprecision for the model and, for this reason especially, the predictions created with it.

Input and/or output data for the system that determines its operational status, but is not accessible, for example, by means of measurement, is also included for this reason in particular. Thus, the precision of the prediction is increased.

A particularly preferred embodiment of the invention consists of a number of analysis modules, which each include a dynamic model of at least one system of the technical facility. Furthermore, at least one additional algorithm based on artificial intelligence is provided at the same time, by means of which correlations at least between the input and/or output data of a first of the analysis modules and the input and/or output data of a second of the analysis modules is identifiable.

This embodiment of the invention relates to the expansion of the device according to the invention to parallel monitoring of interacting systems, whereby the interaction in the form of a relationship between the respective input and/or output data of the analysis modules is determined from additional algorithms based on artificial intelligence and is established as additional correlations (for example, in the form of an equation, a neural network or a characteristic).

Thus develops a precise dynamic model of the interactive systems comprising the dynamic model of the individual systems as well as the additional correlations.

Thus, the current and/or future operational behavior of the individual systems as well as the operational behavior of the facility resulting from the interaction of the systems can be described.

Advantageously identifiable at the same time by means of the correlations is additional output data that characterizes the current and/or future operational behavior of the technical facility, whereby this additional output data includes cross-system information.

Correlations between the said data indicate mutual dependencies, by which the additional output data thus extracted goes beyond the system limits of the individual systems concerned in its informative value, and thus describes the behavior of a larger unit of the technical facility consisting of at least two systems.

Preferably, the operational and/or structural data of the technical facility includes one or more items of information from the group {process data, operational messages, warning messages, disruption messages, monitoring notifications, comments, design of the technical facility, hierarchy of the facility components}.

At the same time, the process data can be acquired online and offline from a control system of the technical facility and/or a subsystem associated with it, or also manually entered.

The operational messages particularly include sensor data and information derived therefrom about the operational status of the technical facility and its systems.

The structural data particularly includes information about the design of the technical facility with regard to the systems comprising the technical facility (facility components, subsystems, system groups) as well as their hierarchical interaction and prioritization.

At the same time, this data can include current and/or historical data, which, for example, is recorded in a short- or long-term archive or in an engineering system.

The operational and/or structural data is preferably supplied by a process control system.

For operating and monitoring complex technical facilities, a process control system in which the mentioned data is available or accrues during operation and is stored is typically used. In this embodiment, the data provision is therefore of especially low complexity.

Furthermore, the invention leads to a method for monitoring a technical facility comprising multiple systems, particularly a power plant facility, including the following steps:

Operational and/or structural data from the technical facility is provided as input data to a dynamic model of at least one system of the technical facility, the dynamic model of the system is improved during the operation of the system by means of an algorithm based on artificial intelligence, and output data that characterizes the current and/or future operational behavior of the system is determined by means of the dynamic model.

The improvement of the dynamic model preferably includes the identification of that input data that has not yet been previously used by the dynamic model, and the dynamic model can be expanded with the help of this input data.

In a further embodiment, a number of dynamic models are provided that in each case describe at least one system of the technical facility and at least one additional algorithm based on artificial intelligence, by means of which correlations at least between the input and/or output data of a first of the dynamic models and the input and/or output data of a second of the dynamic models are identifiable.

Advantageously identifiable by means of the correlations is additional output data that characterizes the current and/or future operational behavior of the technical facility, whereby this additional output data includes cross-system information.

The explanations provided in connection with the device according to the invention and its advantageous embodiments are transferable to the method according to the invention and are therefore not repeated here.

In summary, the invention can be incorporated into the following environment:

Artificial intelligence for the diagnosis of systems of a technical facility, for example a power plant facility, can be used to predict foreseeable failures, whereby all data available in the technical facility can be consulted.

At the same time, the main points of emphasis lie, for example, in genetic algorithms and neural networks for modeling and accomplishing the monitoring tasks, particularly diagnosis tasks.

It is of particular interest to decidedly reduce the expense of diagnosis applications in the technical facility, and furthermore to make possible an improved optimization of the controls.

An improvement is achieved if, on the one hand, the relevant aggregate characteristics of systems of the technical facility, for example, power and energy consumption, are reduced with regard to legal regulations and resource scarcity. On the other hand, customer wishes for improved performance and diagnosis facilities are fulfilled.

Both large systems and small systems can be integrated into the diagnosis by means of genetic/evolutionary algorithms.

It is possible to facilitate conclusions about the status of at least one system of the technical facility by associating genetic (evolutionary) algorithms with Kohonen networks and/or neural networks of any type.

The use of genetic algorithms therefore also makes it possible to include in the determination of the status of a system of the technical facility those parameters that do not directly affect this component of the technical facility, for example as input and/or output signals or media flows.

The methodologies of genetic algorithms (search algorithms) therefore also then allow a calculation of the status of at least one system or of the entire technical facility if the input parameters for the determination of the current status are largely unknown and/or not identifiable or identifiable only with difficulty, for example, by means of an expensive measurement.

Furthermore, the use of artificial intelligence for the diagnosis makes it possible for deviations from calculated current statuses to be reported to the operator of the technical facility in the case of complex facility statuses.

A specific failure notice, for example about the narrowly isolated failure location, can be initially dispensed with in this case, because failures, for example of sensors, are usually measured and reported in any event by an existing control system.

What is instead important in connection with the invention is the identification of creeping processes—that do not necessarily cause immediate failure of a facility component—such as contamination, loss of power through wear, ageing and so forth, which are incorrectly perceived or incorrectly interpreted by people because of the "habituation effect".

In many cases, creeping changes of this type sometimes lead to the failure of the technical facility. The changes are, however, often not identified because an existing control device, for example, attempts to counter this change. Contamination on the blades of a fan is compensated for by re-adjusting the fan blades, for example. Or the control device compensates for decreased outputs in oil pumps or coolant pumps through new reference value specifications;

then the temperature of a bearing, for example, becomes higher only very slowly, because the control device can often delay the moment of system failure in the case of an impending failure. At the same time, however, ever more is demanded of the controlled systems, and the wear increases. The user of the technical facility notices nothing as a result, because, according to the control device, the technical facility continues to function even though one or more systems of the technical facility get closer to their wear limit.

A risky operation exists in particular if a functioning system is operated under increased stress; such stress can be generated through a control device mentioned previously by means of a reference value specification.

For example, a coolant loop is constructed for continuous operation at 50% output. Permanent operation at 70–80% output can then soon lead to serious damages. An impending failure of a coolant pump stricken with a leak remains unnoticed, however, because the control device increases the reference value (i.e. the pressure) for the coolant pump more and more to maintain the function of the coolant loop, which accelerates the failure of the pump further. Not until the failure actually occurs is the failure of the coolant pump noticed as the source of the failure of the cooling system. A device according to the invention as well as a method can provide a remedy here.

Furthermore, genetic algorithms in conjunction with intelligent, adaptive networks allow the identification of risky operating modes of the technical facility, capacity overload or incorrect capacity utilization of units and systems, and so forth. This is advantageously reported to the operator/user of the technical facility, for example in the form of an operational diagram (i.e. a characteristic diagram), from which results the current operation as well as a proposed improved operation.

The presentation of deviations can occur advantageously by means of characteristic diagrams. In addition to the failure prediction, an optimization of the operation of the operation of the technical facility is also possible based on genetic algorithms.

Furthermore, information can be extracted by means of genetic algorithms for the management personnel of the technical facility, which makes possible a conclusion about the overall status of the facility and if appropriate about maintenance procedures necessary within a time interval.

The use of artificial intelligence advantageously makes possible an online calculation of system statuses, i.e. the operator can be notified of a "failure behavior" in his facility and is then able to make anticipatory calculations that make a new approach possible for him.

EXAMPLE

A device according to the invention, for example in the form of a diagnostic system, reports "Failure in coal pulverizer XX grinding rollers zone" to the operator; it is determined through counterchecks that a maintenance procedure for the coal pulverizer is necessary (for example, because this is prescribed by the manufacturer in the related maintenance manual).

By means of anticipatory calculation, it can be determined by means of the diagnostic system according to the invention what would occur if the operator nevertheless leaves his technical facility in operation without maintenance procedures and when the actual appearance of an operational failure of the coal pulverizer is to be expected.

With the combination of genetic algorithms and neural networks as well as optional Kohonen networks, a multitude of conclusions can be reached with respect to the current and/or future status of the technical facility, in particular when a maintenance procedure will be necessary.

BRIEF DESCRIPTION OF THE DRAWINGS

In the following two exemplary embodiments of the invention are described in more detail. They show:
FIG. 1 a system hierarchy, as customarily occurs in technical facilities,
FIG. 2 a device according to the invention, and
FIG. 3 a further embodiment of a device according to the invention with two analysis modules.

DETAILED DESCRIPTION OF THE INVENTION

Figure 3:
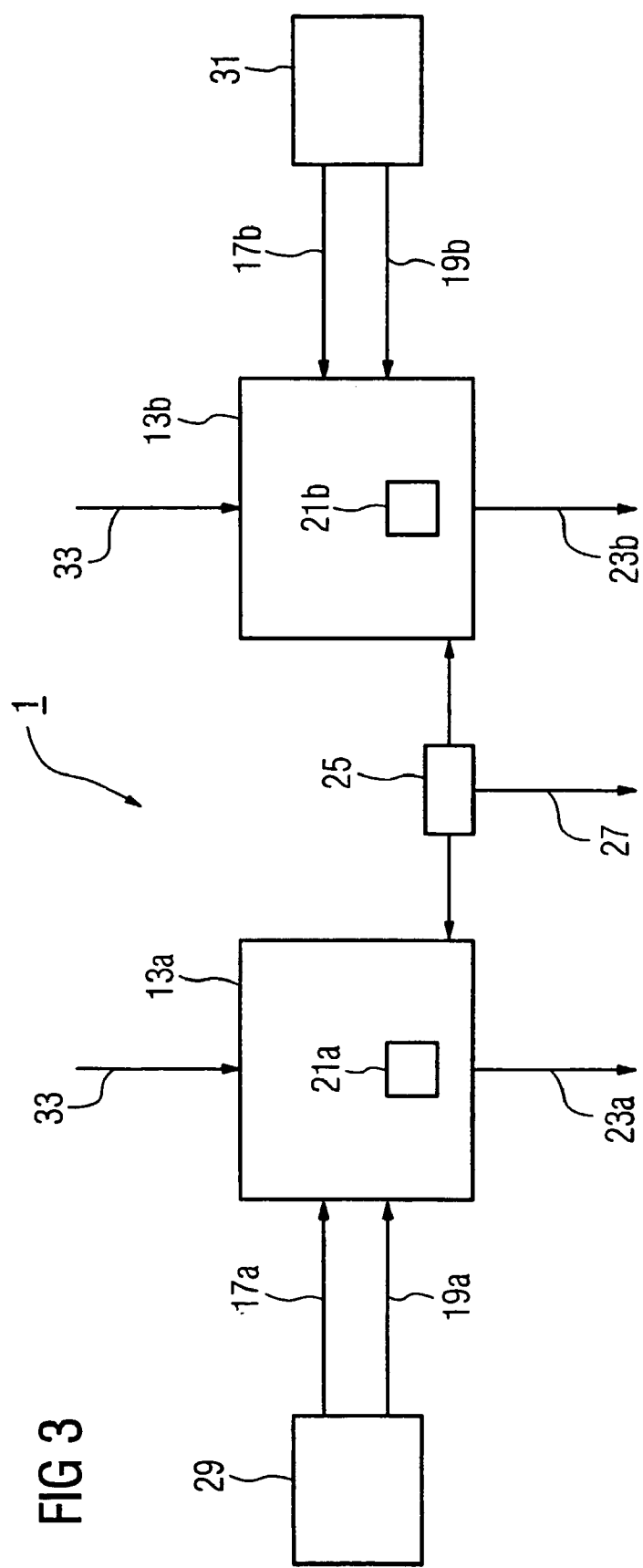

FIG. 1 shows by way of example a hierarchical system design of a technical facility 2.

The technical facility 2 is designed as a power plant facility for the generation of electrical energy and includes two power plant blocks 3.

Each power plant block 3 includes two turbines 5, for example gas turbines. These turbines 5 in turn each contain a coolant loop 9.

This coolant loop 9 includes a turbine blade 11 of the turbine 5.

Each of the mentioned elements should fall under the term system in connection with the invention. A system can therefore include a simple, isolated component such as, for example a turbine blade, as well as a complex system, such as the power plant block 3 or multiple power plant blocks 3.

FIG. 2 shows a device 1 according to the invention with an analysis module 13.

At the same time, operational data 17 and structural data 19 from the technical facility is conveyed to the analysis module 13 as input data.

The operational data 17 can for example involve online measurement data which is recorded in the technical facility in the system itself by means of sensors. At the same time, it can also involve data derived from this measurement data, which is produced in a computer system, for example. Furthermore, the operational data 17 can also include offline measurement data, which is stored in an archive or manually entered, for example.

The structural data 19 describes the technical facility or the system itself. In particular, it includes information about the interconnection of subsystems that are included in the system and their hierarchical arrangement.

A dynamic model 15 is provided for modeling the system behavior. This model 15 can include analytic equations, for example, as well as methods of artificial intelligence such as, for example, neural networks, fuzzy logic or genetic algorithms. Furthermore, simple characteristics can in particular be provided for the description of the system behavior.

An algorithm 21 based on artificial intelligence is provided for the improvement of the dynamic model 15 during the operation of the system 15.

This algorithm 21 based on artificial intelligence can be designed as a genetic algorithm, for example.

An important role for this algorithm 21 consists in effecting dynamic adjustments in the model 15 in order to achieve an improvement of this model 15 in the sense that an improved model behavior and thus a better correlation with the behavior of the actual system is achieved. For example, a modeling error can be called upon for the evaluation of this circumstance, for example, the difference between the actual chronological behavior of the system and the modeled chronological behavior of this system. An improvement of the model 15 can then take place by means of the algorithm 21 based on artificial intelligence. At the same time, the algorithm 21 based on artificial intelligence is particularly used to identify parameters and data not yet considered during modeling which are included in the operational data 10 and/or the structural data 19 but have not yet been called upon for modeling, and to establish further correlations, for example equations or characteristics, including the mentioned identified parameters and/or data, and to add them to the dynamic model 15.

An algorithm 21 based on artificial intelligence designed as a genetic algorithm optimizes correlations included in the dynamic model 15 such as, for example, equations, characteristics or network parameters of a neural network, in that it combines and re-combines evolutionary parameters and data and, at the same time, discovers new correlations in particular, which are not yet included in the dynamic model 15.

In this respect, the described modeling used in connection with the invention and its improvement by means of the algorithm 21 based on artificial intelligence goes beyond known methods of, for example, supervised learning and classical modeling.

The analysis model 13 produces conclusions about the operational behavior of the system as output data 23. At the same time, for example, it can involve current or future operational behavior of the system (creation of a prediction). For example, operational data 17 is conveyed to the analysis module 13, and it is assumed that this operational data will persist over a particular future time period. The output data 23 then allows a conclusion, for example, as to whether and, as the case may be, when a disruption of the system's operation is to be expected. The more precisely the model 15 reflects the actual system behavior, the more precise is this conclusion. A high level of precision for the model 15 is provided by device 1 according to the invention, in particular by means of the algorithm 21 based on artificial intelligence, such that the predictions and diagnoses determined as output data 23 by the analysis module 13 are very precise.

The output data 23 includes, in particular, qualified reports with regard to failure identification (trend analysis, wear and ageing), efficiency, process quality and expected future behavior of the system and the technical facility.

In order to produce reports of this type, a set of rules can be included in analysis module 13 in order to transform output data generated from the model 15 into the mentioned reports. At the same time, the set of rules can include rules for the prediction of a short-term observation period in particular as well as rules for a long-term observation period.

At the same time, in addition to the output data from the model 15, additional information can be conveyed to the set of rules, for example reports and alarms related to the system or the technical facility.

In the illustration for FIG. 3, a device 1 according to the invention includes two analysis modules 13a and 13b.

At the same time, operational data 17a and structural data 19a from a coolant system 29 is conveyed to the analysis module 13a; the analysis module 13b receives operational data 17b and structural data 19b from a generator 31 as input data.

In addition, environmental data 33 for the technical facility is conveyed to both analysis modules 13a, 13b, for example the ambient temperature, atmospheric humidity, atmospheric pressure and so forth.

Each analysis module 13a, 13b detects output data 23a or 23b, which characterizes the operational behavior of the respective analyzed system 29 or 31.

Because the coolant system 29 and the generator 31 are to be considered systems not procedurally isolated from one another, it is to be anticipated that changing operational data 17a from the coolant system 29 in particular influences the system behavior of the generator 31, and thus the output data 23b from the analysis module 13b. The same applies for changing operational data 17b from the generator 31, from which it can be expected that the operational behavior of the coolant system 29 and thus the output data 23a from the analysis module 13a changes as a result.

In order to detect and quantify correlations of this type, the additional algorithm 25 based on artificial intelligence is provided.

This can be designed, for example, as an additional genetic algorithm that produces additional output data 27, which includes cross-system information, and thus goes beyond the characterization of the behavior of one of the systems, and in particular contains information about the interaction of the systems 29 and 31 and their mutual dependencies.

At the same time, the additional algorithm 25 based on artificial intelligence is therefore responsible for identifying and establishing higher-level cross-system correlations. These correlations can include, for example, equations, characteristics or neural networks, which are produced and/or parameterized by the additional algorithm 25 based on artificial intelligence.

At the same time, the strategy for the identification and establishment of cross-system correlations of this type can be similar to the identification and establishment of additional internal system correlations mentioned in connection with FIG. 2 by means of the algorithms 21a, 21b based on artificial intelligence.

By using a device according to the invention and a method according to the invention, it should be possible, in particular, to create conclusions about the system behavior, in particular about that in the future, from a system's existing operational and structural data without complex diagnostic instruments.

A self-adaptive dynamic model of the system is provided for this purpose, which is improved during operation by an algorithm based on artificial intelligence.

The algorithm 21 based on artificial intelligence is used in particular for searching for correlations in a technical facility's operational and/or structural data that is typically available and processed in a control system, for example, and for integrating into the dynamic model the correlations identified in doing so in order to improve the said model incrementally.

It is therefore not necessary that an analytical model of the system or of the technical facility exists. Instead, the model based on, for example, a very simple characteristic from a characteristic array and/or on simple equations, is improved incrementally by means of a correlation analysis of the operational and structural data by means of the algorithm based on artificial intelligence by establishing the correlations determined in doing so, for example, in the form of additional characteristics, equations, and so forth.

In contrast to conventional monitoring and diagnostic devices, the present is preferably based on a data-based method, whereby dependencies between parts of existing operational data and/or between parts of structural data from a technical facility are detected using methods of artificial intelligence and established as quantified correlations, for example equations and/or characteristics, such that a precise dynamic model of at least one system of the technical facility is produced.

The invention claimed is:

1. An electric power system comprising:
   a power plant block; and
   a device, including a computer system, coupled to receive data from the power plant block, the device including an analysis module for:
      providing a dynamic model of a system of the power plant block, configured to generate output data based on the data received from the power plant block; and
      implementing at least one algorithm based on artificial intelligence, that searches for dependencies or correlations among data received by the device, for integrating into the dynamic model new correlations based on said searches to improve the dynamic model of the system, thereby enabling provision of output data indicating changes in current or future operational behavior of the power plant block.

2. The system according to claim 1, wherein an improvement of the dynamic model is based on continual acquisition of operational or structural data associated with a system in the power plant block, including data not previously used by the dynamic model, which data forms a basis to modify the dynamic model.

3. The system according to claim 1, wherein the dynamic model further comprises an element from the group consisting of: a physical equation, a neural network, fuzzy logic, and a genetic algorithm.

4. The system according to claim 1, wherein the dynamic model includes an neural network that is trained using historical operational data from the system.

5. The system according to claim 1, wherein the device is configurable to include a plurality of analysis modules each including a dynamic model of a system of the power plant block and with said at least one algorithm based on artificial intelligence capable of providing correlations between the input and output data of a first of the analysis modules and the input and/or output data of a second of the analysis modules.

6. The system according to claim 5, wherein the device is configurable to charactrerize future operational behavior of the power plant block based on cross-system information.

7. The system according to claim 1, wherein the device is configured to process data from the group consisting of: process data, operational messages, warning messages, disruption messages, monitoring notifications, comments, design of the electric power station, hierarchy of the electric power station, and combinations thereof.

8. The system according to claim 1, wherein the device is configured to process current and historical data associated with the plant power block.

9. The system according to claim 1, wherein the plant power block comprises a process control system coupled to provide operational data and structural data, derived from multiple systems of the plant power block, to the device.

10. The system according to claim 1, wherein the device is configurable with the algorithm based on artificial intelligence to develop relationships among individual correlations of the dynamic model and develop new parametric values based thereon.

11. A method for monitoring a system of the type including a power plant block, comprising:
    acquiring system data during operation of the power plant block;
    providing the data to a computer system;
    using the data to exercise a first dynamic model of at least one system of the power plant block to provide output data indicative of plant operation;
    modifying the dynamic model, with at least one algorithm based on artificial intelligence that searches for dependencies or correlations among acquired data, by integrating into the dynamic model new correlations based on said searches; and
    providing the output data based on the modification of the dynamic model to characterize current or future operational behavior of the power plant block.

12. The method according to claim 11, wherein the step of modifying the dynamic model includes acquiring input data which has not been previously used by the dynamic model.

13. The method according to claim 11, wherein a plurality of additional dynamic models are exercised, each model describing operation of a system of the power plant block and wherein the step of modifying the first dynamic model includes developing correlations based on input data associated with the first dynamic model and input data associated with one of the additional dynamic models.

14. The method according to claim 13, characterized in that the step of modifying the first dynamic model includes developing correlations between output data associated with the first dynamic model and said one of the additional dynamic models whereby the output data includes cross-system information.

* * * * *